United States Patent
Zhang (10) Patent No.: US 8,773,430 B2
(45) Date of Patent: Jul. 8, 2014

(54) METHOD FOR DISTINGUISHING A 3D IMAGE FROM A 2D IMAGE AND FOR IDENTIFYING THE PRESENCE OF A 3D IMAGE FORMAT BY FEATURE CORRESPONDENCE DETERMINATION

(75) Inventor: Tao Zhang, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 262 days.

(21) Appl. No.: 13/514,622

(22) PCT Filed: Dec. 9, 2009

(86) PCT No.: PCT/US2009/006454
§ 371 (c)(1),
(2), (4) Date: Jun. 8, 2012

(87) PCT Pub. No.: WO2011/071467
PCT Pub. Date: Jun. 16, 2011

(65) Prior Publication Data
US 2012/0235996 A1  Sep. 20, 2012

(51) Int. Cl.
*G06T 15/00* (2011.01)
*G06T 7/00* (2006.01)
*G06T 19/00* (2011.01)
*H04N 13/02* (2006.01)
*H04N 13/00* (2006.01)

(52) U.S. Cl.
CPC .............. *G06T 7/0075* (2013.01); *G06T 19/00* (2013.01); *H04N 13/0221* (2013.01); *H04N 13/0029* (2013.01); *H04N 13/004* (2013.01); *H04N 2213/007* (2013.01); *G06T 2207/10012* (2013.01)
USPC ....................................................... 345/419

(58) Field of Classification Search
CPC ........................... G06T 19/00; H04N 13/0221
USPC ....................................................... 345/419
See application file for complete search history.

(56) References Cited

U.S. PATENT DOCUMENTS 5,867,167 A  *  2/1999  Deering ......................... 345/419
6,271,875 B1 *  8/2001  Shimizu et al. .................. 348/42

(Continued)

FOREIGN PATENT DOCUMENTS

DE  102005041249  3/2007
EP     1024672     8/2000

(Continued)

OTHER PUBLICATIONS

Teng et al., "A Registration Method Based on Nature Feature with KLT Tracking Algorithm for Wearable Computers," 2008 International Conference on Cyberworlds, IEEE, Sep. 22, 2008. pp. 416-421.

(Continued)

*Primary Examiner* — David T Welch
(74) *Attorney, Agent, or Firm* — Robert D. Shedd; Jorge Tony Villabon (57) ABSTRACT

A method identifies the presence of a three-dimensional (3D) image format in received image through the use of feature matching and correspondence. The received image is sampled using a candidate 3D format to generate two sub-images from the received image. Initially, these sub-images are compared to determine whether these sub-images are similar with respect to structure. If the sub-images are not similar, a new 3D format is selected and the method is repeated. If the sub-images are similar, features are detected in the two sub-images and a correspondence is formed between features that match in the two sub-images. Positional differences are computed between corresponding features. The amount and uniformity of the positional differences are then used to determine whether the format is 2D or 3D and, if 3D, which of the 3D formats was used for the received image.

13 Claims, 3 Drawing Sheets

(56) References Cited

U.S. PATENT DOCUMENTS

| | | | |
|---|---|---|---|
| 6,791,541 B1* | 9/2004 | Czuchry et al. | 345/419 |
| 6,858,826 B2* | 2/2005 | Mueller et al. | 250/208.1 |
| 2001/0024230 A1* | 9/2001 | Tsukahara | 348/42 |
| 2004/0030741 A1* | 2/2004 | Wolton et al. | 709/202 |
| 2004/0070673 A1* | 4/2004 | Nakamura | 348/207.2 |
| 2005/0089212 A1* | 4/2005 | Mashitani et al. | 382/154 |
| 2006/0192776 A1* | 8/2006 | Nomura et al. | 345/419 |
| 2008/0298672 A1 | 12/2008 | Wallack et al. | |
| 2009/0027381 A1* | 1/2009 | Lee | 345/419 |
| 2009/0295790 A1 | 12/2009 | Pockett | |
| 2010/0053306 A1* | 3/2010 | Hirasawa et al. | 348/43 |
| 2011/0032329 A1* | 2/2011 | Bauza et al. | 348/43 |
| 2011/0032338 A1* | 2/2011 | Raveendran et al. | 348/51 |

FOREIGN PATENT DOCUMENTS

| | | |
|---|---|---|
| EP | 1501316 | 1/2005 |
| JP | 32953934 | 12/1991 |
| KR | 2009025934 | 3/2009 |
| KR | 20090025934 | 3/2009 |
| TW | 200745733 | 12/2007 |
| TW | 200907826 | 2/2009 |

OTHER PUBLICATIONS

Stereoscopy News, "The Doremi GHX-3D Encoder and DSV-12 Server," Oct. 22, 2009, Retrieved from the Internet, 1 page.

Search Report Dated Jul. 22, 2010.

* cited by examiner

METHOD FOR DISTINGUISHING A 3D IMAGE FROM A 2D IMAGE AND FOR IDENTIFYING THE PRESENCE OF A 3D IMAGE FORMAT BY FEATURE CORRESPONDENCE DETERMINATION

This application claims the benefit, under 35 U.S.C. §365 of International Application PCT/US2009/006454, filed Dec. 9, 2009, which was published in accordance with PCT Article 21(2) on Jun. 16, 2011 in English.

CROSS-REFERENCE TO RELATED APPLICATION

This invention is related to a U.S. patent application Ser. No. 13/514,681 entitled "Method For Distinguishing A 3D Image From A 2D Image And For Identifying The Presence Of A 3D Image Format By Image Difference Determination", filed concurrently herewith and commonly assigned to the same assignee hereof, which is incorporated by reference in its entirety.

FIELD OF THE INVENTION

This invention relates to a method for identifying a three-dimensional (3D) image and, more particularly, for identifying a format associated with the 3D image wherein the identification is performed using a feature correspondence determination.

BACKGROUND OF THE INVENTION

Three-dimensional (3D) images exist today in many different digital formats. The number of different formats together with the apparent lack of standardization for formatting such 3D images leads to many problems and further complexities in recognizing the presence of such 3D images and then in determining how the 3D image is formatted in order to process and display the image properly.

Generally 3D contents include a pair of images or views initially generated as separate stereo images (or views). It will be appreciated that the terms "stereo images" and "stereo views" and the terms "images" and "views" may each be used interchangeably without loss of meaning and without any intended limitation. Each of these images may be encoded. In order to store or distribute or display the 3D image, the contents of the two stereo images are combined into a single image frame. So each frame will represent the entire 3D image instead of using two separate stereo images, each in their own frame or file. Various formats for such a 3D image frame are depicted simplistically along the top row of FIG. 1.

Figure 1:
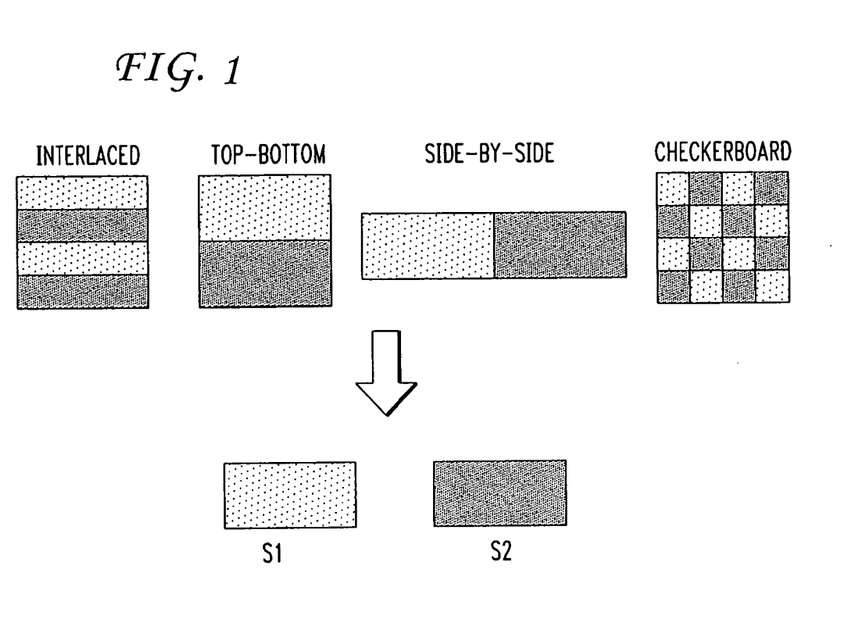
FIGS. 1 and 2 depict a plurality of exemplary 3D image formats.

As seen from FIG. 1, many 3D image frame formats exist today and it is expected that additional formats will be suggested in the future. Some 3D image frame formats include a side-by-side format, a checkerboard pattern format, an interlaced format, a top-bottom format, and a color based format such as an anaglyph. All but the color based format are shown in simplified form in FIG. 1. In this figure, one of the stereo images or stereo views of a 3D image is depicted in light shading, while the second image or view associated with that 3D image is depicted in dark shading. The ability to support multiple frame formats for 3D images will be important for the success of 3D products in the marketplace.

One problem that arises by generating 3D image files in these single frame formats is that the resulting single image frame without further analysis may appear similar to an image frame used for a non-stereo image or a two-dimensional (2D) image. Moreover, a stream of such 3D image frames may initially appear indiscernible from a stream of 2D image frames. When the format and dimensionality of the image frame is not known or communicated to a receiver, significant and as yet unsolved problems arise for image viewers, video players, set-top boxes, and the like, which are used for receiving, processing, and displaying the contents of the image frame stream.

Nowhere has the prior art in this technical field shown an ability to distinguish a single stereo image in 3D formats from a non-stereo single image. Moreover, the prior art in this technical field has similarly failed to show an ability to identify that an image file is in one particular format out of a plurality of possible 3D and 2D formats.

SUMMARY OF THE INVENTION

These and other shortcomings in the prior art are solved by the present inventive method by identifying the presence of a three-dimensional (3D) image format for a received image through the use of feature matching and correspondence. The received image is sampled using a candidate 3D format to generate two sub-images from the received image. Initially, these sub-images are compared to determine whether these sub-images are similar with respect to structure. If the sub-images are not similar, a new 3D format is selected and the method is repeated. If the sub-images are found to be similar, features are detected in the two sub-images and a correspondence is formed between features that match in the two sub-images. Positional differences are computed between corresponding features. The amount and uniformity of the positional differences are then used to determine whether the format is 2D or 3D and, if 3D, which of the 3D formats was used for the received image. When the format of the received image is determined, that format can be used to process and display the received image.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method for identifying a three-dimensional (3D) image and, more particularly, for identifying a format associated with the 3D image wherein the identification is performed using a feature correspondence determination. Although the present invention may be described primarily within the context of a video decoder and display environment, the specific embodiments of the present invention should not be treated as limiting the scope of the invention. It will be appreciated by those skilled in the art and informed by the teachings of the present invention that the concepts of the present invention can be advantageously applied in substantially any video-based environment such as, but not limited to, television, transcoding, video players, image viewers, set-top-box or any software-based and/or hardware-based implementations to identify 3D formats.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Figure 4:
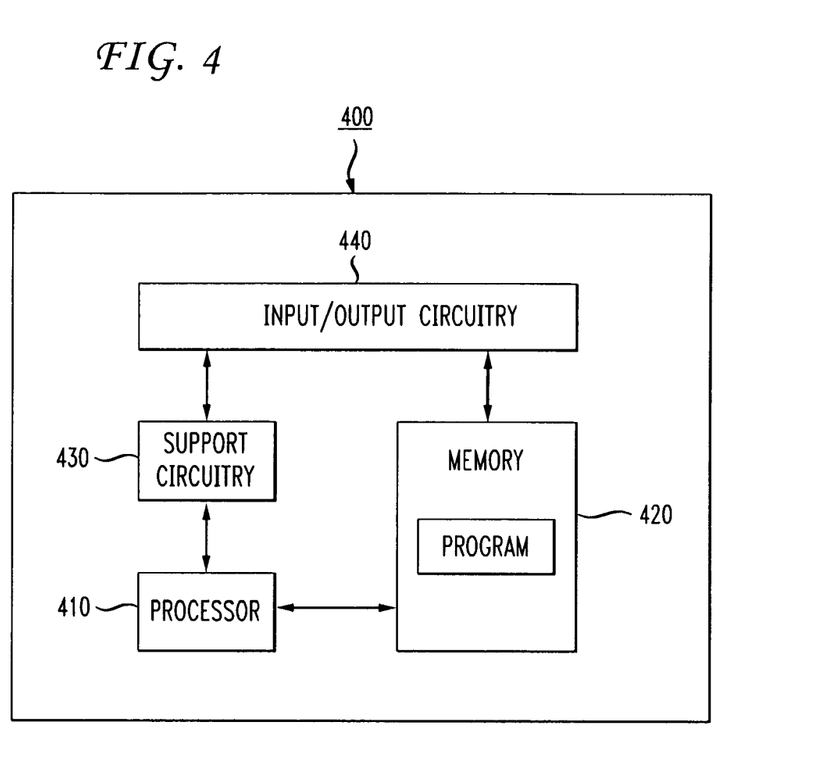
FIG. 4 depicts a high level block diagram of an embodiment of a processing unit suitable for executing the inventive methods and processes of the various embodiments of the present invention.

For example, FIG. 4 depicts a high level block diagram of an embodiment of a processing unit 400 suitable for executing the inventive methods and processes of the various embodiments of the present invention. More specifically, the processing unit 400 of FIG. 4 illustratively comprises a processor 410 as well as a memory 420 for storing control programs, algorithms, stored media and the like. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The processing unit 410 also contains input-output circuitry 440 that forms an interlace between various functional elements communicating with the processing unit 410 such as displays and the like.

Again, although the processing unit 400 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

As such, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown herein.

In accordance with various embodiments of the present invention, a method has been developed to determine whether an image is in a 3D format or whether the image is 3D at all based on the use of feature correspondence information generated from the image. Moreover, the method is capable of identifying which one of the plurality of 3D formats is exhibited by the image, when it has been determined that the image is a 3D image rather than a 2D image. It is understood that a single image in 3D format contains information from two similar, but different, images or views. These two images actually differ significantly because the images are taken from different points of reference and different viewing angles. In contrast, a single 2D image contains information from only a single reference point and viewing angle, therefore, from only a single view. It has been determined herein that these differences can be exploited to show whether the image is or is not in a 3D format. Moreover, it is then possible to determine which particular 3D format has been applied to the image.

FIG. 1 depicts a variety of different 3D formats across the top row. The formats shown include an interlaced format, a top-bottom (also known as over-under) format, a side-by-side format, and a checkerboard pattern format. The interlaced format shown is for horizontal interlacing. It will be appreciated that the orthogonal format to horizontal interlacing, namely, vertical interlacing could be achieved by interlacing alternating columns from each image or view instead of the alternating rows. The formats shown in this figure represent an exemplary listing rather than an exhaustive listing of all known 3D formats. In FIG. 1, one of the stereo images or stereo views ($S_1$) of a 3D image is depicted in light shading, while the second image or view ($S_2$) associated with that 3D image is depicted in dark shading.

As shown in FIG. 1, when the images at the top of FIG. 1 are processed properly according to their respective formats, it is possible to extract the individual stereo images or views, $S_1$ and $S_2$, from the single 3D image at the top. This processing is called sampling later in this application. These separate views can then be applied to a video processor and display for generating the original 3D picture or frame for viewing by a user. It will be appreciated that the resolution of each image $S_1$ and $S_2$ is no more than half the resolution of the entire original 3D image. The terminology of image or view with respect to the entity $S_1$ or $S_2$ is intended to be equivalent without any limitation or loss of generality.

The 3D formats in FIG. 1 can be classified into two groups according to the degree of blending at a pixel level between the left and right views, $S_1$ and $S_2$. One group includes the blended 3D formats while the other group includes the non-blended 3D formats. For blended 3D formats, each pixel tends to be surrounded by pixels from both the left and right views. Examples of blended 3D formats are the interlaced (horizontal or vertical) and checkerboard pattern formats. For non-blended 3D formats, each pixel tends to be surrounded by pixels from the same view with the exception of pixels at view boundaries as can be seen for the pixels at the $S_1/S_2$ boundary in the side-by-side and over-under formats. Side-by-side, over-under, and color based formats are included in the group of non-blended 3D formats. All these formats are well known in the art.

Figure 2:
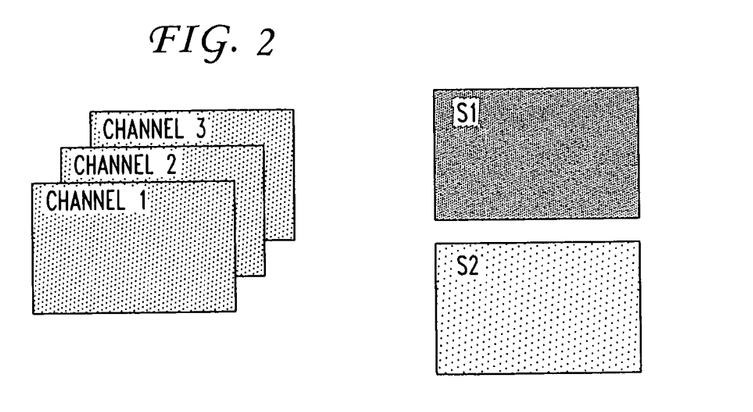

The color-based 3D format, such as a format employing anaglyphs, is shown in FIG. 2. For an anaglyph format, the first channel (e.g., red) can represent one view and the remaining two channels (e.g., blue and green) can represent the other view. So the first channel is taken as $S_1$ and a combination such as a linear combination of channels two and three is taken as $S_2$. This is merely one possible use of the channels and other combinations or techniques can be used to sample the associated color-based 3D format in accordance with alternate embodiments of the present invention.

For a single image in a 3D format, if the single image is sampled to generate two images (views) using the sampling method designed for and corresponding to a candidate 3D format, G, these two images may look quite different in structure or very similar in structure based on the candidate format used for sampling. If these two images (views) are quite different in structure, it can be concluded that the single image is not in candidate 3D format G. If these two images are similar in structure, additional effort is needed to identify the correct 3D format. If features such as point features, line features and the like are detected in both images and if those features are compared, the displacement of features between two images may be observed. If the displacement of features between two images is not uniform and/or if it is quite large, then the image can be classified as being formatted in 3D candidate format G. If the displacement is viewed to be otherwise, then the image can be classified as not being formatted in 3D candidate format G.

Figure 3:
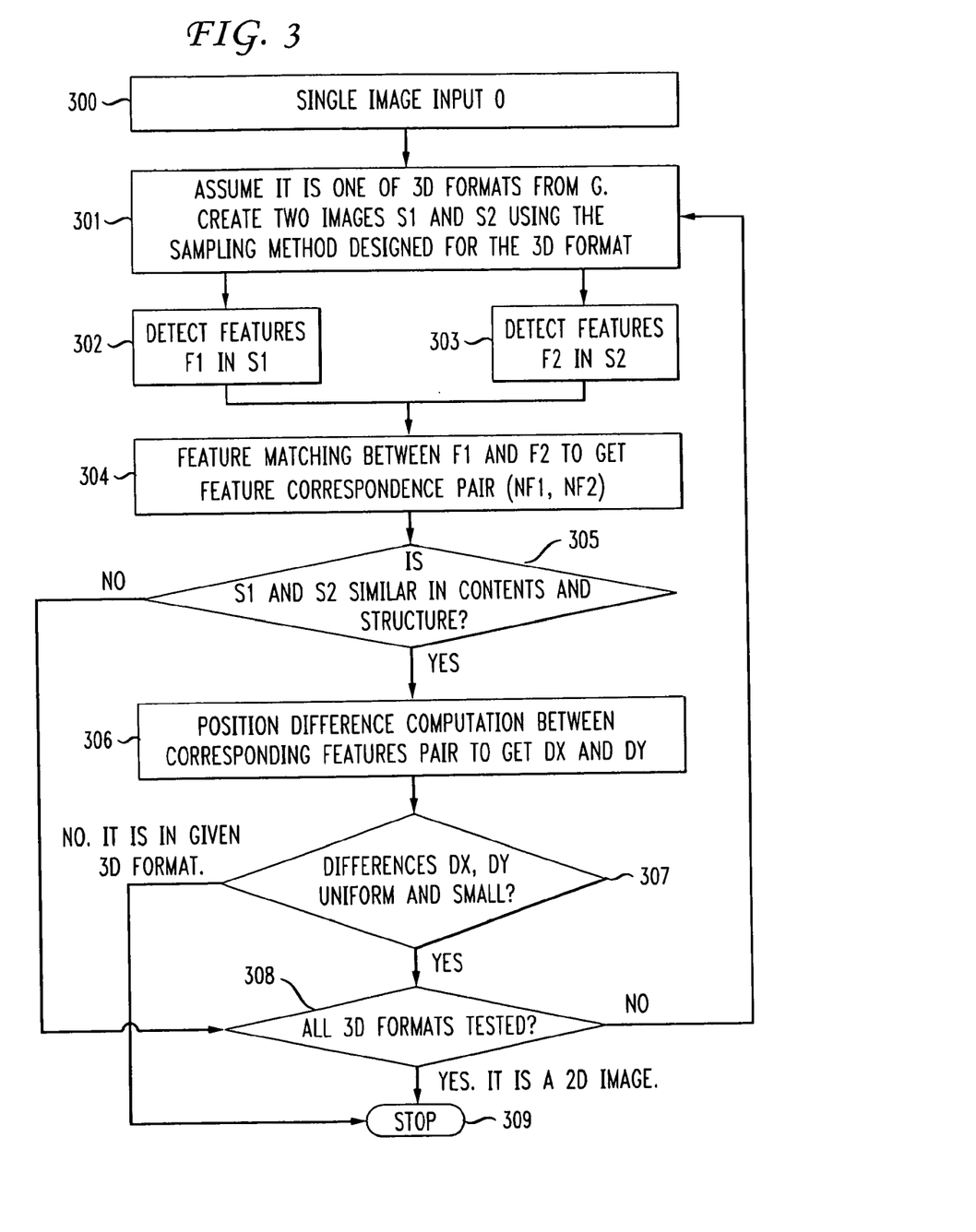
FIG. 3 depicts a flow chart for use in identifying the existence of a particular 3D image format, when present in an image frame under test, in accordance with an embodiment of the present invention.

For a single 2D image input to the method in FIG. 3, if the image is sampled to generate two image views $S_1$ and $S_2$ (see FIG. 1 and FIG. 2), these two images will be almost identical with respect to both contents and depth except for a very small uniform displacement, when the sampling method is for blended 3D formats, or except for totally different contents, when the sampling method is for non-blended 3D formats.

In the description that follows, an explanation is given about distinguishing images in 3D formats from images in a 2D format in accordance with embodiments of the present invention. Examples are provided for each group of formats together with a presentation for a mixture of the two groups of formats.

Initially, it is assumed a received image is sampled to generate two separate images, $S_1$ and $S_2$, as shown in FIGS. 1 and 2. Additionally, it is assumed that the sampling techniques that are being used include techniques for the blended 3D formats, the non-blended 3D formats, and the color-based 3D formats.

An example of the inventive format identification technique in accordance with an embodiment of the present invention will be made in more detail below with respect to FIG. 3. The nomenclature used in the following description in relation to FIG. 3 is described below. It is assumed that there are candidate 3D formats and that, if the image being reviewed is in a particular 3D format, the particular 3D format is from the candidate 3D formats. It should be understood that new 3D formats—that is, formats not currently in the group of candidate 3D formats—can be supported easily by adding them to this group of candidate formats and by including the sampling method properly designed for and corresponding to them in accordance with alternate embodiments of the present invention. G is defined to be a group of 3D formats and their corresponding sampling methods, so that $$G=\{(G_1,M_1), (G_2,M_2), \ldots, (G_{NF},M_{NF})\},$$

where $G_i$ is a candidate 3D format, $M_i$ is the sampling method corresponding to candidate 3D format $G_i$, and NF is the total number of 3D formats supported in the group of candidate formats.

A method for identifying a 3D image and its corresponding format where the format is selected from the group of candidate 3D formats is shown in FIG. 3. The method begins in step 300 during which an input is received as a single image input O. The single image input O is expected to be in either a 3D format or in a 2D format. The method then proceeds to step 301.

In step 301, it is assumed that the input image O is formatted according to a candidate 3D format $G_i$ from the group of candidate formats G. Two images $S_1$ and $S_2$ are then generated from the input image O according to its predefined corresponding sampling method $M_i$. It should be understood that the input image or the resulting images $S_1$ and $S_2$ can also be subjected to a transformation such as from color to grayscale or the like. The method then proceeds to steps 302 and 303 in parallel.

In steps 302 and 303, feature detection is performed on images (views) $S_1$ and $S_2$. The features detected from image $S_1$ in step 302 are identified as, $F1=\{F1_i|i=1 \ldots n_1\}$, and the resulting features detected from image $S_2$ in step 303 are identified as, $F2=\{F2_i|i=1 \ldots n_2\}$, where $n_1$ and $n_2$ are the number of features found in each respective image. Each of steps 302 and 303 transfers control of the method to step 304.

It is also contemplated that feature tracking can be used instead of feature detection and feature correspondence in the steps above. In an example from experimental practice, the KLT feature tracking method was used in the execution of steps 302 and 303. These techniques are well known in the art and are fully described in references cited herein below.

In step 304, feature correspondences (matching) are found between the resulting features F1 from step 302 and F2 from step 303. The feature correspondence or matching process in this step generally removes those features in one image with no correspondences to features in the other image. When the features are removed from each feature set F1 and F2, the new or remaining feature points in $S_1$ are identified as:

$$NF1=\{NF1_i|i=1 \ldots N\},$$

and new or remaining feature points in $S_2$ are identified as:

$NF2=\{NF2_i|i=1 \ldots N\}$, where N is the total number of features having correspondences. A pair designated as ($NF1_i$, $NF2_i$) identifies a pair of matching feature points found in both $S_1$ and $S_2$. Feature correspondence and matching is believed to be well known in the art and will not be described in detail herein. Several references, incorporated herein by reference and listed herein below, disclose a number of the correspondence and selection techniques applied to image features. At the completion of this step, control is transferred either to optional decision step 305 or directly to step 306 when the optional step 305 is not employed.

In step 304, features in $S_1$ and $S_2$ are compared. Other techniques are also contemplated for comparing these features. For example, one technique would involve mapping features in $S_1$ and $S_2$ back to O, and then comparing the mapped features in O. Another technique would involve comparing features between $S_1$ (or $S_2$) and O, the input image. The latter technique may, in certain circumstances, be difficult to implement in order to establish correct feature correspondences.

It is contemplated that feature correspondence can be performed using feature tracking. In the method of FIG. 3, feature detection and feature correspondence computation have been used to find matching features as shown in steps 302, 303, and 304. However, feature matching or correspondence can be implemented as feature tracking instead, as shown below. First, features in $S_1$ are computed. Then, features computed in S1 are used as initial feature positions in $S_2$ to track features in $S_2$. Finally, the features in S2 that are tracked are then determined to correspond to the features in $S_1$. Features lost in tracking in $S_2$ are to be removed.

Although the KLT tracking method was employed in the experimental practice of the inventive method, the method herein does not adopt a specific feature matching or correspondence algorithm as a preferred technique since many feature matching algorithms are contemplated for use by this inventive method. Several feature tracking methods such as the KLT tracking method are taught both in a technical article by Bruce D. Lucas and Takeo Kanade, entitled "An Iterative Image Registration Technique with an Application to Stereo Vision", presented at the International Joint Conference on Artificial Intelligence at pages 674-679 in 1981 and in a report by Carlo Tomasi and Takeo Kanade, entitled "Detection and Tracking of Point Features" in Carnegie Mellon University Technical Report CMU-CS-91-132 published in April 1991. A point feature detection method known as the SIFT method is disclosed in an article by David Lowe entitled "Object recognition from local scale-invariant features" published in the Proceedings of the international Conference on Computer Vision in 1999 at pages 1150-1157. Several different feature detection and matching methods useful in performing feature correspondence are described in a work by A. Ardeshir Goshtasby entitled "2-D and 3-D image registration: for medical, remote sensing and industrial applications", published by Wiley-Interscience in 2005, particularly in Chapter 3 for feature selection at pages 42-63 and in Chapter 4 for feature correspondence at pages 63-106. The teachings of these four references are expressly incorporated herein by reference in their entirety.

Step 305 is an optional decision step. If it is not employed in the method, then control transfers directly from step 304 to step 306. In step 305, the feature correspondences are used to determine whether $S_1$ and $S_2$ are similar in structure and contents. It has been determined from experimental practice that when most features in $S_1$ have correspondences in $S_2$, the structures are similar. For this result, the control is transferred to step 306 along the "YES" branch. On the other hand, when most features in $S_1$ do not have correspondences in $S_2$, the structures are not considered similar. For this result, the control is transferred to step 308 along the "NO" branch. While the term "most" as used in modifying the term "correspondences" may seem to be general in nature, it has been determined that it includes at least all values greater than or equal to 50%, in other words, at least half.

It is understood that the method at decision step 305 performs image processing operations on images $S_1$ and $S_2$ to determine if $S_1$ and $S_2$ are different images, that is, not similar images. The concept of being "different images" is understood to mean that $S_1$ and $S_2$ are from different parts of a single image and that $S_1$ and $S_2$ are totally different in structure. If, in step 305, it is determined that $S_1$ and $S_2$ are different (not similar) in contents and structure, the control is transferred to step 308. Otherwise, the control of the method is transferred to step 306.

Numerous other techniques are available to determine if $S_1$ and $S_2$ are similar in structure or, conversely, different in structure. While some methods may be complicated for performing this determination, it is understood that simple methods exist. Two exemplary methods for determining whether the structures are similar or different are described below. In one such technique described above, feature points in $S_1$ and $S_2$ are compared. If most detected features such as point features in $S_1$ are missing from $S_2$ upon comparison, a determination can be made that the two images are different in structure. Conversely, if most detected features such as point features in $S_1$ are found in $S_2$ upon comparison, a determination can be made that the two images are similar in structure. Another technique uses image differences. If $S_1$ and $S_2$ are similar in structure, their image difference $E=S_1-S_2$, or vice versa for the images, or even absolute valued for the difference, will be minimal and sparse and substantially blank. On the other hand, if $S_1$ and $S_2$ are not similar in structure, that is, if they are different, the differences in image E are huge and the resulting image E is dense. So, when the image E is formed in this technique, the sparseness or density of non-blank pixels can be used to make the similarity determination. A ratio of the total number of non-blank pixels to the total number of pixels can be used to show substantial similarity and substantial difference with respect to structure.

For stereo images and videos, it can be assumed without loss of generality that intensity changes between left and right views (i.e., $S_1$ and $S_2$) are relatively small. So it is possible to use histogram similarity to determine the structure similarity for step 305. Although histogram similarity does not always correspond to or identify structure similarity without complete accuracy, it does typically identify image pairs are not similar. Histogram similarity can be measured by a Bhattacharyya measure denoted by B. This measure is also referenced as the Bhattacharyya distance.

The Bhattacharyya measure or Bhattacharyya distance is well known in the field of statistics. The original paper defining this measure was written by A. Bhattacharyya and is entitled "On a Measure of Divergence Between Two Statistical Populations Defined by their Probability Distributions", published in 1943 in Bull. Calcutta Math. Soc., Vol. 35, pp. 99-110.

In statistics, the Bhattacharyya distance is used to measure the similarity of two discrete probability distributions. It is normally used to measure the separability of classes in classification. For discrete probability distributions p and q over the same domain X, the Bhattacharyya distance can be defined as follows: $DB(p,q)=-\ln(BC(p,q))$, where $$BC(p, q) = \sum_{x \in X} \sqrt{p(x)q(x)}$$

and where $BC(p,q)$ is the Bhattacharyya coefficient. For continuous distributions, the Bhattacharyya coefficient is usually defined as, $BC(p,q)=\int\sqrt{p(x)q(x)}$.

In order to show the determination of similarity, it is useful to show a simple example using histograms. In this example, a histogram is computed for an image. For a gray scale image with intensity between 0-255, the intensity range 0-255 is divided into N bins. When a pixel in the image is shown to have a value v, that pixel is identified as belonging to the bin v/N. The quantity in the bin is then incremented by 1. This is repeated for all the pixels in the image to create the actual image histogram. The histogram actually represents the intensity distribution of the image. Two histograms p and q are generated from the two images or views $S_1$ and $S_2$. Histogram similarity is then simply a determination of how close or similar these two histograms appear. If the two images are similar, the histogram will be similar. It should be appreciated that similarity in histogram does not always mean structure similarity.

The similarity check in step 302 using the Bhattacharyya measure can be realized as a threshold comparison as follows: if B is less than the threshold, the images are similar in structure; otherwise, the images are not similar in structure. In one example, the threshold has been set to 0.04. This threshold value is defined through experimental practice by trial and error. Other techniques may be useful for determining this threshold. At this time, the threshold value shown above has provided excellent result for substantially all images tested to date.

It should be clear that the similarity checks proposed above increase the complexity of the method over the simple similarity check initially described in which missing features are used to determine whether two images are similar.

In step 306, a position difference computation is made between features in a corresponding pair to determine position differences, DX and DY. It is assumed that the position of a feature point NF1$_i$ is $(x_{i1}, y_{i1})$ and the position of corresponding feature point NF2$_i$ is $(x_{i2}, y_{i2})$. The sets of position differences are then described as:

$$DX = \{DXi = x_{i1} - x_{i2} | \text{ for } i = 1 \ldots N\} \text{ and}$$

$$DY = \{DY_i = y_{i1} - y_{i2} | \text{ for } i = 1 \ldots N\}.$$

The position differences are developed through simple subtraction of the ordinates (y-values) and the abscissas (x-values). The computation of position differences of feature points to identify 2D and 3D formats is much simpler than the computation of sparse depth information at these feature points, where depth information would then be used to identify 3D formats. In cases where the intrinsic parameters of cameras and pose information about shooting cameras are unknown, it is difficult to compute depth information, especially in a single image. So the preferred technique for this step is the computation of position differences even though other techniques are known and applicable. At the completion of this step, control is transferred directly to decision step 307.

It should be understood that, while the difference operations for DX and DY to compute the positional differences involve simple subtraction, it has been contemplated that the positional differences could also be computed using absolute value differences.

In decision step 307, the position differences DX and DY are analyzed to determine whether the position difference is uniform and small. If the position difference is found to be uniform and small, the input image is not in the candidate 3D format $G_i$ being tested in this iteration of the method. At this point, control is transferred to step 308 along the "YES" branch. If the position difference is found not to be uniform and small, the input image is formatted in the candidate 3D format $G_i$ being tested in this iteration of the method. At this point, control is transferred to step 309 along the "NO" branch.

It should be understood that there are a number of well-known techniques capable of analyzing the position differences in step 307. One exemplary technique suitable for use herein employs a heuristic thresholds, $\alpha_x$ and $\alpha_y$, where $\alpha$ is usually measured in pixels. In this exemplary technique, the maximum value of the absolute value of the position difference expressed as max(abs(DX)) and max(abs(DY)) are individually compared to their respective thresholds $\alpha_x$ and $\alpha_y$. If the position difference is less than or equal to the threshold, then the position difference is determined to be uniform and small, that is, the "YES" branch from decision step 307. Otherwise, the thickness is determined to be neither uniform nor small, that is, the "NO" branch from decision step 307.

In another example from experimental practice, it is possible to use the mean value and the variance of the position differences or other statistics such as standard deviation in step 307.

When control is transferred to decision step 308, the process checks whether all possible candidate 3D formats $G_i$, for $i = 1, 2, \ldots$ NF, have been tested. If all candidate formats have been tested, it is determined that the input image O is a 2D image and process control is shifted to step 309. If all candidate formats G have not been tested, then process control is shifted to step 301 where a new candidate format $G_i$ is selected for the next iteration of the process.

Each of the blended formats, non-blended formats, and color-based formats, as well as the mixed formats mentioned above, requires a sampling technique that is specific to the format so that the two images can be extracted properly. FIGS. 1 and 2 depict techniques for generating two images (views) from a single image in different 3D formats. The sampling methods are straightforward and well known in the art and will not be described herein further in detail.

For example, in the horizontal interlaced format, the corresponding sampling method extracts one line (i.e., horizontal row of pixels) for image $S_1$ and then the next line for $S_2$, iteratively. The order of the lines from the original single image is maintained in creating the two images $S_1$ and $S_2$. In an alternative realization of this sampling technique, it is contemplated that the lines are grouped in pairs so that two consecutive lines are extracted for $S_1$ and then the next two consecutive lines are extracted for image $S_2$. Other alternative realizations are contemplated for this sampling technique.

For the vertical interlaced format, the corresponding sampling method extracts one line (i.e., vertical column of pixels) for image $S_1$ and then the next line for $S_2$, iteratively. The order of the lines from the original single image is maintained in creating the two images $S_1$ and $S_2$. Alternative realizations are contemplated for this sampling technique in a manner similar to the alternatives mentioned for the horizontal interlaced technique.

For the checkerboard pattern format, the corresponding sampling technique extracts the odd pixels from the odd rows together with the even pixels from the even rows for image $S_1$ while it also extracts the even pixels from the odd rows together with the odd pixels from the even rows for image $S_2$. In a similar manner, this technique could be realized to extract alternating groups of pixels instead of individual pixels.

Sampling for the non-blended 3D formats is simpler in that the sampler merely separates $S_1$ and $S_2$ at their interface in the single image. For example, $S_1$ can be taken from the left side (half) of the single image while $S_2$ is taken from the right side (half) of the single image for the side-by-side format. A similar approach can be taken for sampling the top-bottom format.

Sampling, as discussed above, is performed in such a manner that the resulting image or view $S_1$ contains only pixels from one view and image $S_2$ contains pixels from the other view. It is contemplated also that sampling is performed on the same channel such as the Y channel in a YUV file or the G channel in an RGB file. Alternatively, sampling can also be done from one or more different channels. When the image is in grayscale, pixels are typically sampled from the only channel. However, when the image is in color such as ne having RGB channels, the sampling can be performed on any of the three channels or parts of all of them. For example, in the interlaced format, channel R can be sampled to get image $S_1$ and channel G can be sampled to obtain image $S_2$ or channel R can be sampled to obtain image $S_1$ while channel B is sampled to obtain image $S_2$, and so on.

The feature correspondence based method described herein has been shown as an iterative individual method in FIG. 3. It should also been contemplated that yet another embodiment of a method of the present invention allows for batch processing rather than iterative processing so that the information for all the candidate 3D formats are computed at the same time. In this latter embodiment, the method decisions (e.g., 3D vs. 2D and particular 3D format) can be determined on all the information computed.

The order of the views $S_1$ and $S_2$ is believed to be insignificant. That is, the views can be interchanged with each other without affecting the result of the method. The general requirement of the sampling methods is that the resulting image $S_1$ should contain only pixels from one view and the resulting image $S_2$ should contain pixels only from the other view.

It is contemplated that the order of operation of certain steps in the method of FIG. 3 can be interchanged without departing from the spirit of this invention. In particular, it is contemplated that the order of the group of steps 302-304 and optional step 305 can be interchanged so that the feature detection and the feature matching/correspondence/tracking steps is performed after determining whether the images $S_1$ and $S_2$ are similar.

In the co-pending related patent application identified above, the method disclosed employs a technique relying on image difference. This technique is fundamentally different from the techniques described herein that rely on feature correspondence. Feature correspondence based methods detect features and establish a one-by-one correspondence between detected features. In contrast, image difference based methods do not rely on features for proper operation.

Having described various embodiments for a method for the identifying 3D image formats (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A method for identifying the presence of a three-dimensional (3D) image format in a received image, the method comprising:
  generating first and second sub-images from the received image using a sampling method corresponding to a candidate 3D format selected from a plurality of 3D formats;
  detecting at least one feature in the first and second sub-images;
  determining a correspondence between the at least one feature in the first sub-image and the at least one feature in the second sub-image;
  computing positional differences between the at least one feature in the first sub-image that correspond to the at least one feature in the second sub-image;
  comparing said first and second sub-images to determine whether the first and second sub-images are similar with respect to structure;
  wherein, if said positional differences are determined to be uniform and less than or equal to a threshold, determining whether each 3D format of the plurality of 3D formats has been selected as a candidate 3D format;
  wherein if the first and second sub-images are determined to be not similar in structure from said comparing, determining whether each 3D format of the plurality of 3D formats has been selected as a candidate 3D format; and
  if all 3D formats in the plurality of 3D formats have been selected, identifying the received image as a two-dimensional (2D) format; and
  if all 3D formats in the plurality of 3D formats have not been selected, selecting as the candidate 3D format a 3D format not previously selected from the plurality of 3D formats and repeating the generating and computing steps using the not previously selected 3D format; and
  wherein, if said positional differences are determined not to be uniform and are determined to be greater than the threshold, identifying the received image as being formatted in a candidate 3D format used to make such determination; and
  wherein, if the first and second sub-images are determined to be similar in structure from said comparing, executing the step of detecting one or more features in each of the first and second sub-images.

2. The method as defined in claim 1 wherein said determining a correspondence comprises feature tracking of the features detected in one sub-image with features detected in the other sub-image.

3. The method as defined in claim 2 wherein said feature tracking includes a Kanade-Lucas-Tomasi (KLT) tracking method.

4. The method as defined in claim 1 wherein said determining a correspondence comprises feature matching and feature correspondence.

5. The method as defined in claim 1 wherein said plurality of 3D formats includes formats selected from the group consisting of blended 3D formats, non-blended 3D formats, and color-based 3D formats.

6. The method as defined in claim 1 wherein said structure includes both structure and content.

7. The method as defined in claim 1 further including processing for display said received image according to the identified format.

8. The method as defined in claim 1 wherein said generating first and second sub-images further comprises filtering each of the first and second sub-images to be in a single channel of a plurality of channels so that said single channel of said first sub-image is identical to said single channel of said second sub-image.

9. The method as defined in claim 1 wherein said comparing said first and second sub-images to determine whether the first and second sub-images are similar with respect to structure comprises comparing at least one feature point in the first sub-image with at least a corresponding one feature point in the second sub-image.

10. The method as defined in claim 9 wherein said comparing said first and second sub-images to determine whether the first and second sub-images are similar with respect to structure further comprises detecting one or more features in each of said first and second sub-images.

11. The method as defined in claim 1 wherein said comparing said first and second sub-images to determine whether the first and second sub-images are similar with respect to structure further comprises evaluating a ratio of non-blank pixels in an edge map to a total number of pixels in said edge map as a measure of structure similarity.

12. An apparatus for identifying the presence of a three-dimensional (3D) image format in a received image, comprising:
  generating first and second sub-images from the received image using a sampling method corresponding to a candidate 3D format selected from a plurality of 3D formats;
  means for detecting at least one feature in the first and second sub-images;

means for determining a correspondence between the at least one feature in the first sub-image and the at least one feature in the second sub-image;

means for computing positional differences between the at least one feature in the first sub-image that correspond to the at least one feature in the second sub-image;

means for comparing said first and second sub-images to determine whether the first and second sub-images are similar with respect to structure;

wherein, if said positional differences are determined to be uniform and less than or equal to a threshold, determining whether each 3D format of the plurality of 3D formats has been selected as a candidate 3D format;

wherein if the first and second sub-images are determined to be not similar in structure from said comparing, determining whether each 3D format of the plurality of 3D formats has been selected as a candidate 3D format; and if all 3D formats in the plurality of 3D formats have been selected, identifying the received image as a two-dimensional (2D) format; and if all 3D formats in the plurality of 3D formats have not been selected, selecting as the candidate 3D format a 3D format not previously selected from the plurality of 3D formats and repeating the generating and computing steps using the not previously selected 3D format; and wherein, if said positional differences are determined not to be uniform and are determined to be greater than the threshold, identifying the received image as being formatted in a candidate 3D format used to make such determination; and wherein, if the first and second sub-images are determined to be similar in structure from said comparing, executing the detecting of one or more features in each of the first and second sub-images.

13. A non-transitory computer-readable medium having computer-executable instructions for execution by a processing system, the computer-executable instructions for identifying the presence of a three-dimensional (3D) image format in a received image, when executed, cause the processing system to:

generate first and second sub-images from the received image using a sampling method corresponding to a candidate 3D format selected from a plurality of 3D formats;

detect at least one feature in the first and second sub-images;

determine a correspondence between the at least one feature in the first sub-image and the at least one feature in the second sub-image;

compute positional differences between the at least one feature in the first sub-image that correspond to the at least one feature in the second sub-image;

compare said first and second sub-images to determine whether the first and second sub-images are similar with respect to structure;

wherein, if said positional differences are determined to be uniform and less than or equal to a threshold, determine whether each 3D format of the plurality of 3D formats has been selected as a candidate 3D format;

wherein if the first and second sub-images are determined to be not similar in structure from said comparing, determine whether each 3D format of the plurality of 3D formats has been selected as a candidate 3D format; and if all 3D formats in the plurality of 3D formats have been selected, identify the received image as a two-dimensional (2D) format; and if all 3D formats in the plurality of 3D formats have not been selected, select as the candidate 3D format a 3D format not previously selected from the plurality of 3D formats and repeat the generate and compute steps using the not previously selected 3D format; and wherein, if said positional differences are determined not to be uniform and are determined to be greater than the threshold, identify the received image as being formatted in a candidate 3D format used to make such determination; and wherein, if the first and second sub-images are determined to be similar in structure from said comparing, execute the detection of one or more features in each of the first and second sub-images.

* * * * *